(12) United States Patent
Liu et al.

(10) Patent No.: US 11,611,965 B2
(45) Date of Patent: Mar. 21, 2023

(54) SYSTEM AND METHOD FOR BEAM MANAGEMENT IN HIGH FREQUENCY MULTI-CARRIER OPERATIONS WITH SPATIAL QUASI CO-LOCATION

(71) Applicant: FutureWei Technologies, Inc., Plano, TX (US)

(72) Inventors: Bin Liu, San Diego, CA (US); Pengfei Xia, San Diego, CA (US)

(73) Assignee: Futurewei Technologies, Inc., Plano, TX (US)

(*) Notice: Subject to any disclaimer, the term of this patent is extended or adjusted under 35 U.S.C. 154(b) by 114 days.

(21) Appl. No.: 17/176,620

(22) Filed: Feb. 16, 2021

(65) Prior Publication Data

US 2021/0168788 A1   Jun. 3, 2021

Related U.S. Application Data

(63) Continuation of application No. 15/837,669, filed on Dec. 11, 2017, now Pat. No. 10,925,062.
(Continued)

(51) Int. Cl.
*H04W 72/04* (2009.01)
*H04L 5/00* (2006.01)
(Continued)

(52) U.S. Cl.
CPC .......... *H04W 72/046* (2013.01); *H04L 5/005* (2013.01); *H04L 5/0051* (2013.01);
(Continued)

(58) Field of Classification Search
None
See application file for complete search history.

(56) References Cited

U.S. PATENT DOCUMENTS

| 2002/0128027 A1* | 9/2002 | Wong | H04B 7/0408 |
| | | | 455/562.1 |
| 2004/0204110 A1* | 10/2004 | Davidson | H04B 7/0408 |
| | | | 455/562.1 |

(Continued)

FOREIGN PATENT DOCUMENTS

| CN | 104620551 A | 5/2015 |
| CN | 106465375 A | 2/2017 |
| WO | 2016078565 A1 | 5/2016 |

OTHER PUBLICATIONS

"3rd Generation Partnership Project; Tehnical Specification Group Radio Access Network; Study on New Radio Access Technology, Physical Layer Aspects, (Release 14)," 3GPP TR 38.802 V14.2.0; Sep. 2017, 143 pages.

(Continued)

*Primary Examiner* — Hong S Cho
(74) *Attorney, Agent, or Firm* — Slater Matsil, LLP

(57) ABSTRACT

When spatial quasi co-location is established between component carriers, beam management, e.g., beam configuration or reference signal configuration, of one component carrier may be performed based at least in part on beam management information of the other. Information specifying that component carriers or reference signals cross component carriers are spatially quasi co-located, or information about a SQCL group including spatially quasi co-located carriers, may be transmitted to a UE, e.g., using broadcast signaling, radio resource control (RRC) signaling, a media access control-control element (MAC-CE), downlink control information (DCI) signaling, or a combination thereof.

38 Claims, 9 Drawing Sheets

Related U.S. Application Data

(60) Provisional application No. 62/480,004, filed on Mar. 31, 2017.

(51) Int. Cl.
  *H04W 72/00* (2009.01)
  *H04W 72/044* (2023.01)
  *H04W 72/0446* (2023.01)
  *H04W 72/0453* (2023.01)

(52) U.S. Cl.
  CPC ......... *H04L 5/0098* (2013.01); *H04W 72/005* (2013.01); *H04W 72/048* (2013.01); *H04W 72/0446* (2013.01); *H04W 72/0453* (2013.01); *H04L 5/001* (2013.01); *H04W 72/042* (2013.01)

(56) References Cited

U.S. PATENT DOCUMENTS

| | | | |
|---|---|---|---|
| 2013/0286960 A1 | 10/2013 | Li et al. | |
| 2014/0198763 A1* | 7/2014 | Sorrentino | H04L 27/2675 370/330 |
| 2015/0085838 A1* | 3/2015 | Benjebbour | H04B 7/0617 370/336 |
| 2015/0341882 A1* | 11/2015 | Davydov | H04L 1/0026 370/336 |
| 2015/0349940 A1* | 12/2015 | Kim | H04L 5/005 370/329 |
| 2015/0372851 A1 | 12/2015 | Kakishima et al. | |
| 2016/0156401 A1* | 6/2016 | Onggosanusi | H04B 7/0645 370/329 |
| 2017/0054479 A1 | 2/2017 | Sang et al. | |
| 2018/0062807 A1* | 3/2018 | Seo | H04L 1/00 |
| 2018/0083680 A1* | 3/2018 | Guo | H04L 5/0007 |
| 2018/0227035 A1* | 8/2018 | Cheng | H04B 7/0695 |
| 2018/0242327 A1* | 8/2018 | Frenne | H04L 25/0204 |
| 2019/0312628 A1* | 10/2019 | Bergström et al. | H04B 7/0617 |
| 2020/0059281 A1* | 2/2020 | Grant | H04B 7/088 |

OTHER PUBLICATIONS

Huawei, et al., "Discussion on beam management aspects for DL MIMO", 3GPP TSG RAN WG1 Meeting #86bis, R1-1609414, Oct. 10-14, 2016, 5 pages, Lisbon, Portugal.

Huawei, et al., "Unified single/multiple beam operations for initial access", 3GPP TSG RAN WG1 Meeting #87, R1-1611667, Nov. 14-18, 2016, 10 pages, Reno, USA.

Catt, "NR cell for idle state", 3GPP TSG-RAN WG2 Meeting #95bis, R2-166125, Oct. 10-14, 2016, 6 pages, Kaohsiung.

* cited by examiner

SYSTEM AND METHOD FOR BEAM MANAGEMENT IN HIGH FREQUENCY MULTI-CARRIER OPERATIONS WITH SPATIAL QUASI CO-LOCATION

This patent application is a continuation of U.S. application Ser. No. 15/837,669, filed on Dec. 11, 2017 which claims priority to U.S. Provisional Application No. 62/480,004, filed on Mar. 31, 2017 and entitled "Spatial Quasi Co-Location in High Frequency Multi-Carrier System and Method," which is hereby incorporated by reference herein as if reproduced in its entirety.

TECHNICAL FIELD

The present invention relates generally to wireless communications, and in particular embodiments, to techniques and mechanisms for beam management in high frequency multi-carrier operations with spatial quasi co-location.

BACKGROUND

In 5G new radio (NR), high frequency carriers, such as mmWave carriers, are used to provide high data rate wireless communications. However, high frequency carriers suffer from significant path loss, causing reduced transmission efficiency. Beamforming techniques have been employed to combat the path loss of high frequency waveforms, where a number of high-gain transmit and/or receive beams are formed in different angular directions, and possibly at different time slots, for transmitting and receiving wireless signals. Beam management procedures are also defined and used to manage beamforming processes.

SUMMARY OF THE INVENTION

Technical advantages are generally achieved, by embodiments of this disclosure which describe a system and method for beam management in high frequency multi-carrier operations with spatial quasi co-location.

According to one aspect of the present disclosure, there is provided a method that includes: transmitting, by a transmit receive point (TRP) that communicates with user equipments (UEs) over a plurality of carriers, a message comprising an indication indicating that a second carrier is spatially quasi co-located with a first carrier; and configuring, by the TRP, a second reference signal representing a second TRP beam for communications between the TRP and a first UE in the second carrier based at least in part on a first reference signal representing a first TRP beam for communications between the TRP and the first UE in the first carrier, the second reference signal being spatially quasi co-located with the first reference signal.

According to another aspect of the present disclosure, there is provided an apparatus that includes a non-transitory memory storage comprising instructions; and one or more processors in communication with the memory storage, wherein the one or more processors execute the instructions to: transmit a message comprising an indication indicating that a second carrier is spatially quasi co-located with a first carrier, the apparatus communicating with user equipments (UEs) over a plurality of carriers; and configure a second reference signal representing a second transmit receive point (TRP) beam for communications between the apparatus and a first UE in the second carrier based at least in part on a first reference signal representing a first TRP beam for communications between the apparatus and the first UE in the first carrier, the second reference signal being spatially quasi co-located with the first reference signal.

Optionally, in any of the preceding aspects, the message is transmitted in a broadcast channel, radio resource control (RRC) signaling, a media access control-control element (MAC-CE), downlink control information (DCI) signaling, or a combination thereof.

Optionally, in any of the preceding aspects, the indication is an identifier identifying a spatial quasi co-location (SQCL) carrier group, the SQCL carrier group comprising the first carrier and the second carrier.

Optionally, in any of the preceding aspects, the indication is a bit value indicating whether the second carrier is spatially quasi co-located with the first carrier.

Optionally, in any of the preceding aspects, the first TRP beam comprises a transmit beam of the TRP or a receive beam of the TRP, and the second TRP beam comprises a transmit beam of the TRP or a receive beam of the TRP.

Optionally, in any of the preceding aspects, whether the second reference signal is spatially quasi co-located with the first reference signal is specified in radio resource control (RRC) signaling, a media access control-control element (MAC-CE), downlink control information (DCI) signaling, or a combination thereof.

Optionally, in any of the preceding aspects, the one or more processors execute the instructions to further: specify that the second reference signal is spatially quasi co-located with the first reference signal in radio resource control (RRC) signaling, a media access control-control element (MAC-CE), downlink control information (DCI) signaling, or a combination thereof.

Optionally, in any of the preceding aspects, the first reference signal or the second reference signal comprises a channel state information reference signal (CSI-RS), a synchronization signal block (SSB), a demodulation reference signal (DMRS), a phase tracking reference signal (PTRS), a tracking reference signal (TRS), or a sounding reference signal (SRS).

According to yet another aspect of the present disclosure, there is provided a method that includes: receiving, by a user equipment (UE) from a transmit receive point (TRP), a message that comprises an indication indicating that a second carrier is spatially quasi co-located with a first carrier; and receiving, by the UE, a second reference signal representing a second TRP beam for communications between the TRP and the UE in the second carrier, the second reference signal being spatially quasi co-located with a first reference signal representing a first TRP beam for communications between the TRP and the UE in the first carrier.

According to yet another aspect of the present disclosure, there is provided a non-transitory memory storage comprising instructions; and one or more processors in communication with the memory storage, wherein the one or more processors execute the instructions to: receive, from a transmit receive point (TRP), a message that comprises an indication indicating that a second carrier is spatially quasi co-located with a first carrier; and receive a second reference signal representing a second TRP beam for communications between the TRP and the apparatus in the second carrier, the second reference signal being spatially quasi co-located with a first reference signal representing a first TRP beam for communications between the TRP and the apparatus in the first carrier.

Optionally, in any of the preceding aspects, receiving the message comprises receiving the message in a broadcast channel, in radio resource control (RRC) signaling, a media access control-control element (MAC-CE), downlink control information (DCI) signaling, or a combination thereof.

Optionally, in any of the preceding aspects, the indication is an identifier identifying a spatial quasi co-location (SQCL) carrier group, the SQCL carrier group comprising the first carrier and the second carrier.

Optionally, in any of the preceding aspects, the indication is a bit value indicating whether the second carrier is spatially quasi co-located with the first carrier.

Optionally, in any of the preceding aspects, the first TRP beam or the second TRP beam comprises a TRP receive beam or a TRP transmit beam.

Optionally, in any of the preceding aspects, whether the second reference signal is spatially quasi co-located with the first reference signal is specified in radio resource control (RRC) signaling, a media access control-control element (MAC-CE), downlink control information (DCI) signaling, or a combination thereof.

Optionally, in any of the preceding aspects, the first reference signal or the second reference signal comprises a channel state information reference signal (CSI-RS), a synchronization signal block (SSB), a demodulation reference signal (DMRS), a phase tracking reference signal (PTRS), a tracking reference signal (TRS), or a sounding reference signal (SRS).

Optionally, in any of the preceding aspects, the method further includes configuring, by the UE, a second beam for communications with the TRP in the second carrier when the TRP uses the second TRP beam, the second beam being configured based on a first beam of the UE that is configured for communicating with the TRP in the first carrier when the TRP uses the first TRP beam.

Optionally, in any of the preceding aspects, the one or more processors execute the instructions to further: configure a second beam for communications with the TRP in the second carrier when the TRP communicates using the second TRP beam, the second beam being configured based on a first beam of the apparatus that is configured for communicating with the TRP in the first carrier when the TRP communicates using the first TRP beam.

Optionally, in any of the preceding aspects, the first beam or the second beam is a UE receive beam or a UE transmit beam.

According to yet another aspect of the present disclosure, there is provided a method that includes configuring, by a transmit receive point (TRP) that communicates with user equipments (UEs) over a plurality of carriers, a first reference signal (RS) in a first carrier such that the first RS is spatially quasi co-located with a second RS in a second carrier.

According to yet another aspect of the present disclosure, there is provided an apparatus that includes a non-transitory memory storage comprising instructions; and one or more processors in communication with the memory storage, wherein the one or more processors execute the instructions to: configuring a first reference signal (RS) in a first carrier such that the first RS is spatially quasi co-located with a second RS in a second carrier, the apparatus communicating with user equipments (UEs) over a plurality of carriers.

Optionally, in any of the preceding aspects, the first RS or the second RS comprises a channel state information RS (CSI-RS), a synchronization signal (SS), a demodulation reference signal (DMRS), a phase tracking reference signal (PTRS), a tracking reference signal (TRS), or a sounding reference signal (SRS).

Optionally, in any of the preceding aspects, the method further includes specifying, by the TRP to a UE, that the first RS is spatially quasi co-located with the second RS via radio resource control (RRC) signaling, a media access control-control element (MAC-CE), downlink control information (DCI) signaling, or a combination thereof.

Optionally, in any of the preceding aspects, the one or more processors execute the instructions to further: specify, to a UE, that the first RS is spatially quasi co-located with the second RS via radio resource control (RRC) signaling, a media access control-control element (MAC-CE), downlink control information (DCI) signaling, or a combination thereof.

Optionally, in any of the preceding aspects, a first CSI-RS in the first carrier has a longer periodicity in frequency than a second CSI-RS in the second carrier, or the first CSI-RS has a lower density in frequency than the second CSI-RS.

BRIEF DESCRIPTION OF THE DRAWINGS

For a more complete understanding of the present disclosure, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
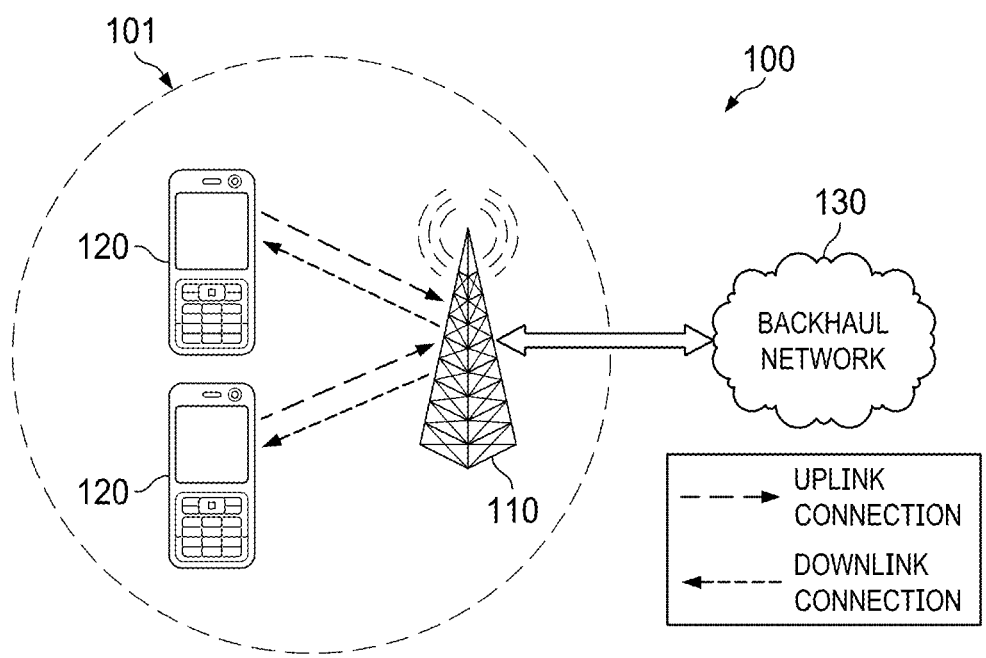
FIG. 1 illustrates a diagram of an embodiment wireless communications network.

The making and using of embodiments of this disclosure are discussed in detail below. It should be appreciated, however, that the concepts disclosed herein can be embodied in a wide variety of specific contexts, and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Beam management is performed when beamforming techniques are utilized for communications over high frequency carriers to compensate for path loss due to the use of high frequency carriers. When multiple component carriers are spatially quasi co-located, beam management of a first component carrier may be performed based at least in part on related information of a second component carrier. This reduces beam management overhead of the first component carrier, and improves communications performance. The related information may include beam management information of the second component carrier that is obtained or produced during beam management in the second component carrier.

In some embodiments, with the knowledge of spatially quasi co-located component carriers, a transmit-receive point (TRP) or a user equipment (UE) that supports communication over multiple component carriers, may perform beam management for one component carrier based at least in part on beam management information of the other component carrier. For example, the TRP or the UE may configure a transmit or receive beam in a first component carrier based at least in part on beam management information of a second component carrier that is spatially quasi co-located with the first component carrier. In some embodiments, configuring a TRP beam may include configuring a reference signal (RS) representing the TRP beam. For example, when two carriers (e.g., Carrier 1 and Carrier 2) are spatially quasi co-located with each other, a TRP may configure a first TRP beam in Carrier 1 for communications with a UE based on a second TRP beam in Carrier 2 that is used for communications with the UE. In this case, the TRP may configure a first RS representing the first TRP beam in Carrier 1 based at least in part on a second RS representing the second TRP beam in carrier 2. The first RS is spatially quasi co-located with the second RS.

In some embodiments, information about spatially quasi co-located component carriers may be transmitted to a UE. Based on the transmitted information, the UE may determine the spatial quasi co-location among the component carriers. In some embodiments, the information about spatially quasi co-located component carriers may include the component carriers that are spatially quasi co-located. For example, a message may be sent to the UE including identifiers of the spatially quasi co-located component carriers, where each of the identifiers identifies one of the spatially quasi co-located component carriers. In some embodiments, component carriers that are spatially quasi co-located may be grouped into a spatial quasi co-location (SQCL) group. Multiple SQCL groups may be formed, each including a set of spatially quasi co-located carriers, and being assigned an SQCL group identifier identifying the respective SQCL group. In this case, the information about spatially quasi co-located component carriers may include one or more SQCL group identifiers, and carrier identifiers identifying component carriers under the respective SQCL groups. In some embodiments, the information about spatially quasi co-located component carriers may include an indication indicating that the component carriers are spatially quasi co-located. The indication may include any control information or signal that directly or indirectly references the spatially quasi co-located component carriers. For example, a message may be sent to the UE including a bit value that indicates whether a first carrier is spatially quasi co-located with a second carrier. In one example, a bit value of 1 may indicate that the first carrier is spatially quasi co-located with the second carrier, while a bit value of 0 may indicate that the first carrier is not spatially quasi co-located with the second carrier. A field, e.g., a control information field, may be defined to carry the bit value and indicates spatial quasi co-location between two carriers. For example, a control field may be defined in a radio resource control (RRC) message, a MAC control element (MAC-CE), or downlink control information (DCI) to indicate SQCL of components. In another example, the bit value may be a flag bit. In another example, the indication may be carried in a field associated with a SQCL group, or include an identifier of the SQCL group that include the first and the second carriers.

In one example, a UE may communicate with a TRP over a first carrier. When the TRP configures to communicate with the UE over a second carrier, the UE may determine whether the second carrier is spatially quasi co-located with the first carrier according to the above described information transmitted by the TRP. When the second carrier is spatially quasi co-located with the first carrier, the UE may perform beam management for communicating over the second carrier based on beam management information or related information of the first carrier. In one example, the UE may check whether the first carrier and second carrier belong to a SQCL group to determine whether the two carriers are spatially quasi co-located. In another embodiment, the UE may check whether there is any information (e.g., a flag bit) indicating that the second carrier is spatially quasi co-located with the first carrier. In some embodiments, information about spatially quasi co-located reference signals may also be transmitted to UEs. The information about spatially quasi co-located reference signals may include an indication that indicates whether a first reference signal in the first carrier is spatially quasi co-located with a second reference signal in the second carrier. Similarly, an indication of spatially quasi co-located reference signals may include any control information or signal that directly or indirectly references the spatially quasi co-located reference signals, such as a field associated with spatially quasi co-located reference signals, a value indicating that reference signals are spatially quasi co-located with one another. The information about spatially quasi co-located component carriers or spatially quasi co-located reference signals may be transmitted in broadcast signaling, radio resource control (RRC) signaling, a media access control-control element (MAC-CE), downlink control information (DCI) signaling, or a combination thereof.

FIG. 1 illustrates a network 100 for communicating data. The network 100 comprises a base station no having a coverage area 101, a plurality of mobile devices 120, and a backhaul network 130. As shown, the base station 110 establishes uplink (dashed line) and/or downlink (dotted line) connections with the mobile devices 120, which serve to carry data from the mobile devices 120 to the base station 110 and vice-versa. Data carried over the uplink/downlink connections may include data communicated between the mobile devices 120, as well as data communicated to/from a remote-end (not shown) by way of the backhaul network 130. As used herein, the term "base station" refers to any component (or collection of components) configured to provide wireless access to a network, such as a transmit-receive point (TRP), an enhanced base station (eNB), a macro-cell, a femtocell, a Wi-Fi access point (AP), or other wirelessly enabled devices. Base stations may provide wireless access in accordance with one or more wireless communication protocols, e.g., long term evolution (LTE), LTE advanced (LTE-A), High Speed Packet Access (HSPA), Wi-Fi 802.1a/b/g/n/ac, 5G new radio (NR), etc. As used herein, the term "mobile device" refers to any component (or collection of components) capable of establishing a wireless connection with a base station, such as a user equipment (UE), a mobile station (STA), and other wirelessly enabled devices. In some embodiments, the network 100 may comprise various other wireless devices, such as relays, low power nodes, etc.

The network 100 may provide wireless communications over a single carrier, or over an aggregation of different component carriers (i.e., carrier aggregation). The different component carriers may be in different bands or in the same bands. For example, the network 100 may support carrier aggregation of multiple low frequency (LF) component carriers, multiple high frequency (HF) component carriers, or a LF component carrier and a HF component carrier.

Figure 2:
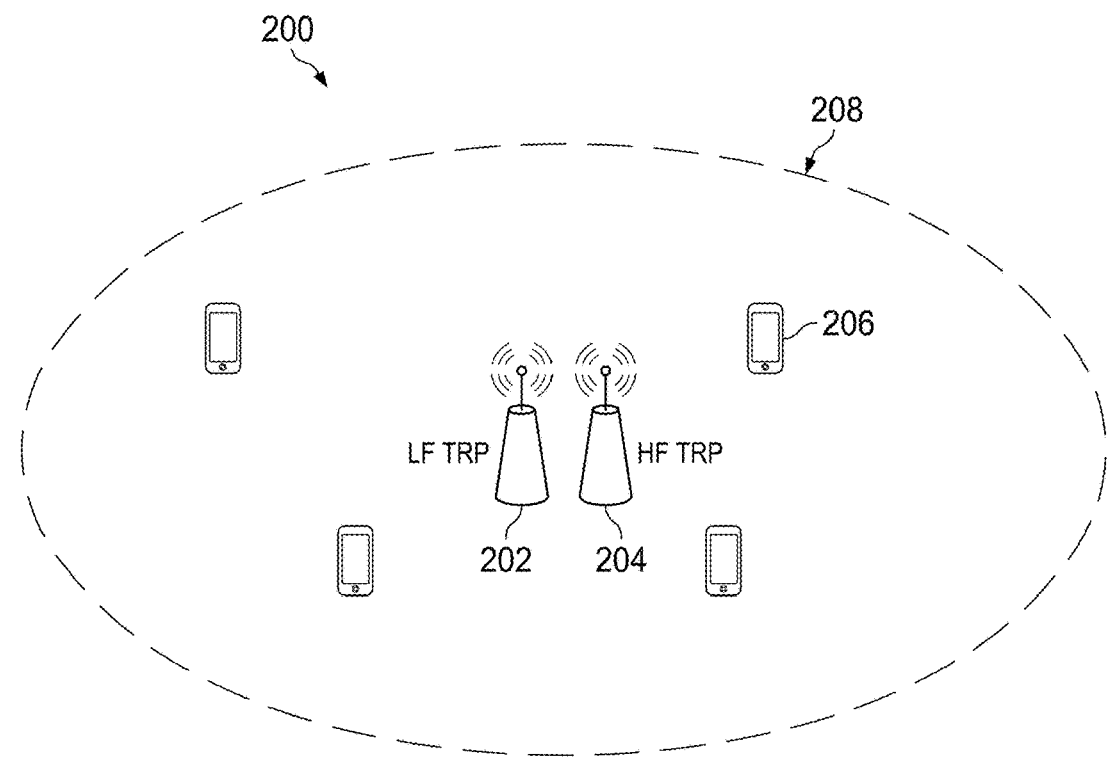
FIG. 2 illustrates a diagram of another embodiment wireless communications network.
Figure 3:
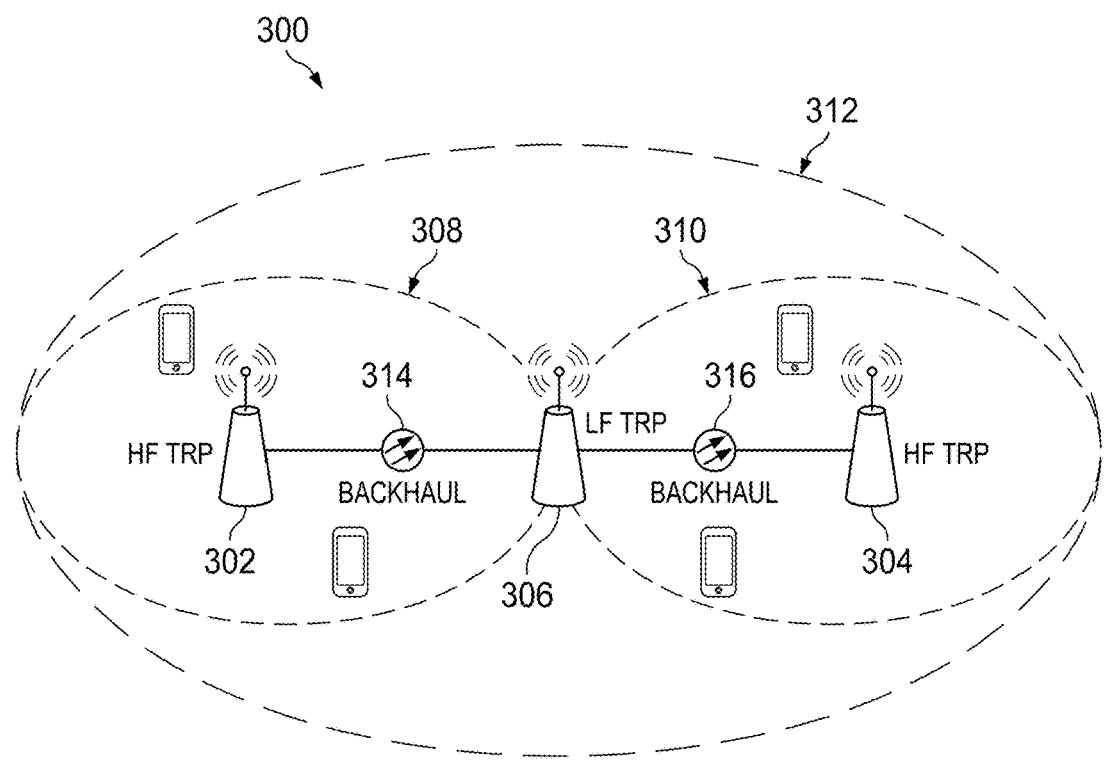
FIG. 3 illustrates a diagram of yet another embodiment wireless communications network.

The different component carriers may be co-located (or co-sited) or located in different sites. FIG. 2 illustrates a diagram of an embodiment network 200 for wireless communications, where different component carriers are co-located. As shown, the network 200 includes a TRP 202 and a TRP 204 co-located in the same site. The TRP 202 and TRP 204 communicate with a plurality of UEs 206 in a coverage area of 208 over a LF carrier and a high frequency carrier, respectively. As such, the LF carrier and the high frequency carrier are co-located. FIG. 3 illustrates a diagram of another embodiment network 300 for wireless communications, where different component carriers are located in different sites. The network 300 supports wireless communications with a plurality of UEs over two different high frequency carriers provided by a TRP 302 and a TRP 304, and over a LF carrier provided by a TRP 306. As shown, TRPs 302, 304, 306 are located in different sites, with TRP 302 providing a coverage area 308, TRP 304 providing a coverage area 310, and the three TRPs providing a coverage area 312. TRP 302 is connected to TRP 306 via a backhaul network 314, and TRP 304 is connected to TRP 306 via a backhaul network 316.

In general, a LF carrier can provide large coverage and robust connections but a relatively low data rate, and a high frequency carrier can provide a high data rate because of its large bandwidth. However, a HF carrier generally has small coverage due to large path loss, and link robustness is also a concern in HF transmissions. In 5G new radio (NR), due to the introduction of high frequencies, channel characteristics of component carriers in multiple carrier operations may be substantially different. In particular, millimetre wave high frequency (HF) links suffer inherently from large path loss and random blockage. To compensate the path loss, beamforming techniques are used, where a number of high-gain transmit and/or receive beams are formed for transmitting and receiving wireless signals. Each of the beams may cover only a small region in an angular direction. The beams may be referred to as directional beams. As a result, transmissions performed through the formed beams become highly directional. Beamforming may be used to mimic omni-directional transmissions or transmissions covering a large area within a range of angles by forming multiple beams at different directions, possibly over different time slots. In high frequency communications, a large number of antenna elements is required to bring a sufficient transmit/receive gain. In this case, significantly large overhead may be caused, e.g., in beam identification for initial access, or in beam management for communications in connected states.

Beam management may be performed to manage beamforming procedures on a UE side or a TRP side. According to the 3rd Generation Partnership Project (3GPP) technical report (TR) 38.802 V2.0.0 (2017-03), which is hereby incorporated by reference as if reproduced in its entirety, beam management in NR is defined as (see section 6.1.6.1):

a set of L1/L2 procedures to acquire and maintain a set of TRP(s) and/or UE beams that can be used for downlink (DL) and uplink (UL) transmission/reception, which include at least following aspects:

Beam determination: for TRP(s) or UE to select of its own Tx/Rx beam(s).

Beam measurement: for TRP(s) or UE to measure characteristics of received beam-formed signals Beam reporting: for UE to report information of beam-formed signal(s) based on beam measurement Beam sweeping: operation of covering a spatial area, with beams transmitted and/or received during a time interval in a predetermined way.

According to 3GPP TR 38.802 V2.0.0 (see section 6.1.6.1), the following DL L1/L2 beam management procedures are supported within one or multiple TRPs:

P-1: is used to enable UE measurement on different TRP Tx beams to support selection of TRP Tx beams/UE Rx beam(s)

For beamforming at TRP, it typically includes an intra/inter-TRP Tx beam sweep from a set of different beams. For beamforming at UE, it typically includes a UE Rx beam sweep from a set of different beams.

P-2: is used to enable UE measurement on different TRP Tx beams to possibly change inter/intra-TRP Tx beam(s)

From a possibly smaller set of beams for beam refinement than in P-1. Note that P-2 can be a special case of P-1.

P-3: is used to enable UE measurement on the same TRP Tx beam to change UE Rx beam in the case UE uses beamforming Uplink beam management may include uplink L1/L2 beam management procedures similar to the DL L1/L2 beam management procedures described above, with procedures U-1, U-2 and U-3 corresponding to the procedures P-1, P-2 and P-3, respectively. Beamforming based access and beam management may incur large overhead in HF communications. For example, performing beam sweeping from a large amount of transmission beams by a TRP for downlink transmissions may take long time and consume significant TRP power. In another example, when a TRP supports multiple component carriers, beam management may need to be performed separately and independently for each of the component carriers.

Figure 4:
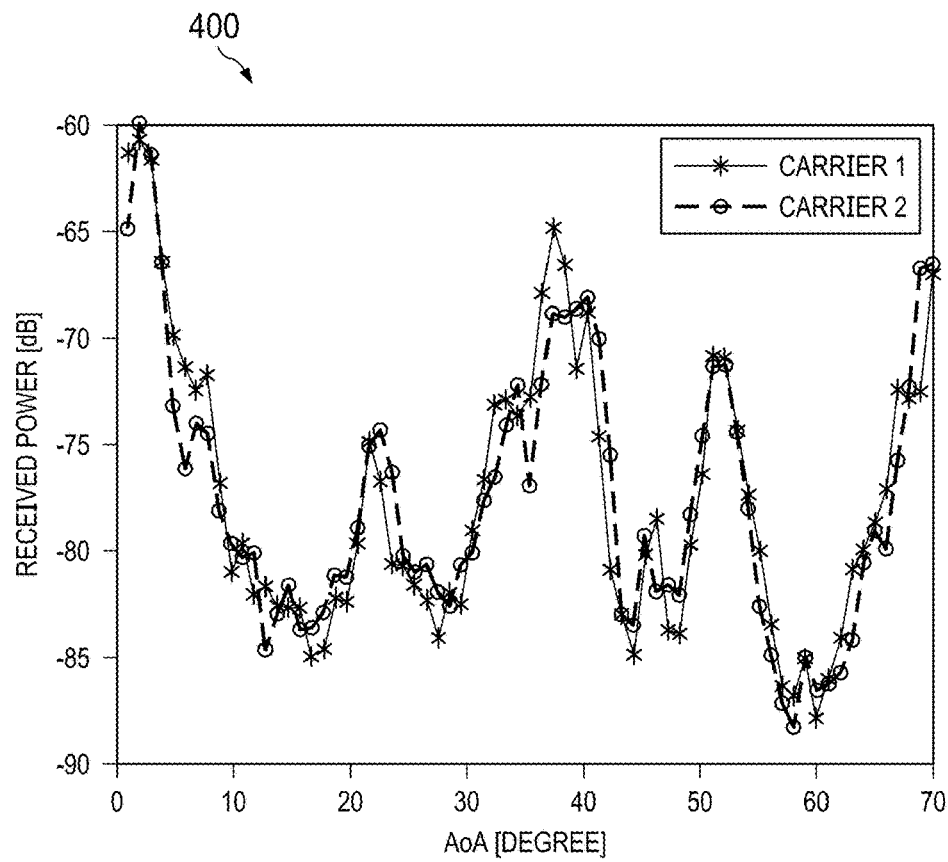
FIG. 4 illustrates a graph showing received powers on two high frequency component carriers varying with angles of arrival.
Figure 5:
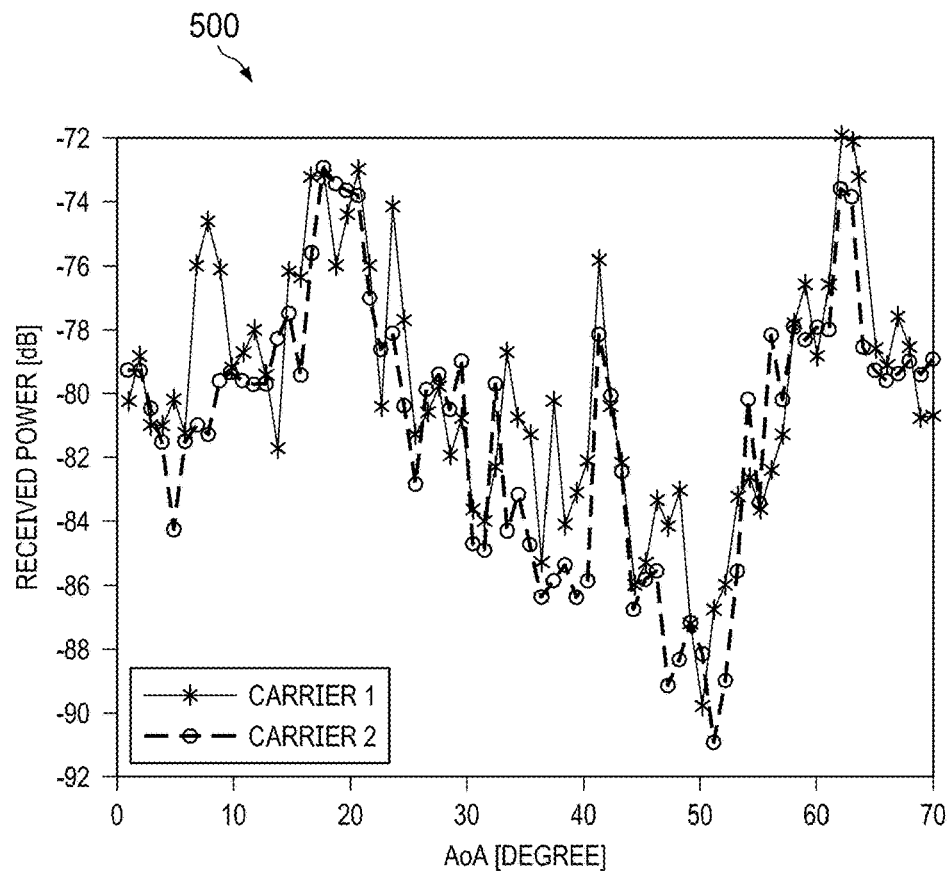
FIG. 5 illustrates another graph showing received powers on two high frequency component carriers varying with angles of arrival.
Figure 6:
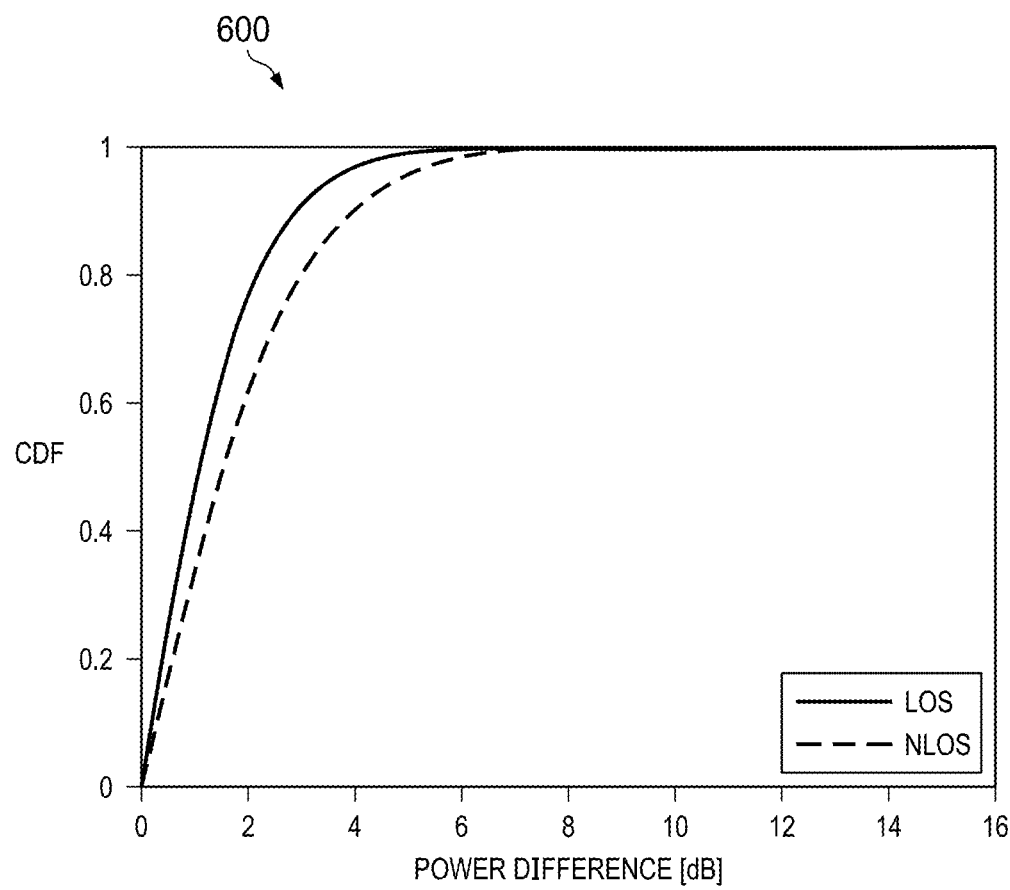
FIG. 6 illustrates a graph showing cumulative distribution functions of differences between received powers of two high frequency component carriers.

Quasi-colocation, (or quasi co-location, QCL) is also defined in 3GPP TR 38.802 V2.0.0, section 6.1.6.5, where definition of QCL is that "two antenna ports are said to be quasi co-located if properties of the channel over which a symbol on one antenna port is conveyed can be inferred from the channel over which a symbol on the other antenna port is conveyed." QCL as defined supports the following functionalities at least Beam management functionality: at least including spatial parameters Frequency/timing offset estimation functionality: at least including Doppler/delay parameters RRM management functionality: at least including average gain It has been shown that in a case of aggregation of multiple HF carriers, and when two TRPs, each of which provides communications services over a HF carrier, are co-located, and the two high frequencies are sufficiently close to each other, the two HF carriers show similar receive power distribution in the spatial domain. In one example, measurements of received powers by UEs on two HF component carriers in the spatial angle of arrival (AoA) domain may be obtained to show the similarity. In this example, the two HF component carriers are co-located at a TRP as an indoor hotspot and in a frequency band of 28 GHz. Carrier 1 has a bandwidth of 200 MHz at 27.9 GHz, and carrier 2 has a bandwidth of 200 MHz at 28.1 GHz. FIG. 4 is a graph 400 showing how received powers on the two HF component carriers vary with AoA in a scenario having line-of-sight (LOS). The x-axis represents AoA in degrees, and the y-axis represents received powers in dB. FIG. 5 is a graph 500 showing how received powers on the two HF component carriers vary with AoA in a scenario of non-line-of-sight (NLOS). As shown in FIG. 4 and FIG. 5, power distributions of the two HF component carriers in the AoA domain are very similar to each other. In general, more than 95% power differences between carrier 1 and carrier 2 in the case of LOS are less than 4 dB, and more than 90% power differences between carrier 1 and carrier 2 in the case of NLOS are less than 4 dB. FIG. 6 is a graph 600 showing cumulative distribution functions (CDFs) of differences between received powers of the two HF component carriers in the scenarios of LOS and NLOS, respectively. As seen, the CDFs in the cases of LOS and NLOS are also very close to each other, and the LOS or NLOS does not affect power distribution properties of the two HF component carriers.

The example as illustrated in FIGS. 4-6 shows that spatial QCL (in terms of downlink beam profiles) may be established across the two HF component carriers in the case of the multiple-HF carriers operations. In this case, beam management information (e.g., received power) about one HF component carrier may be, at least partly, reused in beam management of the other, reducing beam management overhead.

Embodiments of the present disclosure recognize that when two or more HF component carriers are generally spatially quasi co-located (or spatially quasi-colocated), or when spatial QCL can be established across the two or more HF component carriers, the two or more HF component carriers have similar beam profiles. In this case, beam management information of one HF component carrier may be used, at least in part, by another HF component carrier in performing beam management procedures, or may be at least useful or helpful in performing beam management procedure by one another. In general, two HF component carriers are spatially quasi co-located when 1) the component carriers are co-located (or co-sited), and 2) the component carriers are close to each other in frequency. In some embodiments, reference signals, e.g., synchronization signals (SSs), CSI-RSs or demodulation reference signals (DMRSs), etc., in one HF component carrier may be configured to be spatially quasi co-located with reference signals (e.g., SSs, CSI-RSs or DMRSs, etc.) in another spatially quasi co-located HF component carrier. In some embodiments, when a HF component carrier is co-located with a LF component carrier, a spatial QCL may also be established across the HF component carrier and the LF component carrier. In this case, related information of the LF component carrier, such as a direction of arrival (DoA), may also be helpful or used in performing beam management of the HF component carrier. In some embodiments, reference signals (e.g., SSs, CSI-RSs or DMRSs, etc.) in the HF component carrier may be configured to be spatially quasi co-located with reference signals (e.g., SSs, CSI-RSs or DMRSs, etc.) in the LF component carrier.

When two carriers (e.g., carrier 1 and carrier 2) are spatially quasi co-located, a reference signal (RS), such as a SS, a CSI-RS, a DMRS, etc., in one carrier may be configured to be spatially quasi co-located with another RS in the other carrier. For example, a CSI-RS in carrier 1 may be configured to be spatially quasi co-located with a CSI-RS in carrier 2. In another example, a CSI-RS in carrier 1 may be configured to be spatially quasi co-located with a SS in carrier 2. In yet another example, a SS in carrier 1 may be configured to be spatially quasi co-located with a CSI-RS in carrier 2. In yet another example, a SS in Carrier 1 may be configured to be spatially quasi co-located with a SS in carrier 2. A RS in this disclosure may refer to a SS (or a SS block), a CSI-RS, a DMRS, a phase tracking reference signal (PTRS), a tracking reference signal (TRS), or a sounding reference signal (SRS), or any other reference signals used in wireless communications.

Establishing spatial QCL across multiple component carriers is beneficial for reducing beam management overhead, simplifying beam management procedures, improving communication efficiency, and improving quality of service and user experience. The benefits may include shortened beam sweep time, reduced beam management power consumption, faster beam determination, shortened transmission latencies, and reduced overhead associated with beam management reference signals, among others.

A beam profile may include beam management information that is produced or obtained during beam management procedures, or information that is related to beam management. Examples of beam management information may include measurements reported by UEs, such as reference signal received power (RSRP), and reference signal received quality (RSRQ), a downlink and/or uplink beam group, downlink and/or uplink beam, downlink and/or uplink beam angles, such as AoAs, beam pair links (BPLs), such as a pair of transmit beam and receive beam, a reference signal, beam powers, and beam gains. For example, RSRP or RSRQ of a TRP transmit beam may be obtained during a beam measurement and reporting procedure of a UE. In another example, a BPL may be produced during a beam determination procedure where a TRP determines or selects a receive beam corresponding to a transmit beam of a UE, or where a UE determines or selects a receive beam corresponding to a transmit beam of a TRP. Information that is related to beam management may generally include a direction of a received or a transmitted signal. The direction may be used when determining beam sweeping region or a transmit/receive beam during beam management.

With spatial QCL is established across multiple component carriers, and/or spatial QCL is configured between reference signals of the multiple component carriers, beam management information of one component carrier may be reused or used during beam management procedures of another. In one embodiment, when two HF component carrier (e.g., carrier 1 and carrier 2) are spatially quasi co-located, for downlink beam management, a TRP may perform downlink beam sweeping (e.g., procedure P-1) for carrier 1 in a region that is determined based on RSRPs (or RSRQs) reported for carrier 2. The RSRP (and/or RSRQ) may be based on UE measurements on corresponding downlink reference signals (such as SSs, CSI-RSs or DMRSs, etc.). For example, the TRP may identify a TRP transmit beam in carrier 2 based on the RSRP (and/or RSRQ)

reported by UEs, and determine the region based on the TRP transmit beam in carrier 2. In another embodiment, a TRP or a UE may skip procedure P-1 and starts procedure P-2 and/or P-3 based on a BPL that has been determined for carrier 2 to select a refined TRP transmit beam for carrier 1, and/or to select a refined UE receive beam for carrier 1. In yet another embodiment, a TRP or a UE may configure a transmit beam or a receive beam in carrier 1 based on beam management information of carrier 2.

In some embodiments, a first RS (e.g., a CSI-RS, a DMRS, or a SS block) in carrier 1 may be spatially quasi co-located with a second RS (e.g., a CSI-RS, a DMRS, or a SS block) in carrier 2. In this case, a TRP may configure the first RS for carrier 1 based at least in part on the RS that has been used for carrier 2. In one example of CSI-RS, CSI-RSs for carrier 1 and carrier 2 may have different periodicities or densities. For example, a CSI-RS for carrier 1 may have a longer periodicity than a CSI-RS for carrier 2. In another example, a CSI-RS for carrier 1 may have a lower density in frequency than carrier 2. Configuration of the first RS for carrier 1 may include information about resource elements for carrying RSs, e.g., a number of the resource elements, and/or location of the resource elements in a resource block. Information specifying spatial QCL between the first RS and the second RS may also be transmitted to one or more UEs, e.g., via RRC, MAC-CE, DCI signaling or a combination thereof, and in a carrier, e.g., in carrier 1 or carrier 2. When the TRP transmits the first RS in a first RS resource in carrier 1 to a UE, the UE may detect the first RS in carrier 1 based on the RS configuration in carrier 1 and at least in part on the second RS in carrier 2, where the first RS in carrier 1 is spatially quasi co-located with the second RS in carrier 2. In one example, the UE may determine that the same receive beam used to receive the second RS in carrier 2 may be used to receive the first downlink RS in carrier 1, where the first RS in carrier 1 is spatially quasi co-located with the second RS in carrier 2. In another example, the UE may select a beam to receive the first downlink RS in carrier 1, where the beam has the same spatial characteristics (e.g., beam direction, beamforming gain, beam width, etc.) as a beam used to receive the second RS in carrier 2, and where the first RS in carrier 1 is spatially quasi co-located with the second RS in carrier 2. In these cases, the UE doesn't need to detect and determine a receive beam in carrier 1 from scratch (e.g., procedure p-1) and significant beam detection overhead is thus avoided.

In some embodiments, configuring a TRP beam may include configuring a RS representing the TRP beam. When two carriers (e.g., Carrier 1 and Carrier 2) are spatially quasi co-located with each other, a TRP may configure a first TRP beam in Carrier 1 for communications with a UE based on a second TRP beam in Carrier 2 that is used for communications with the UE. In one embodiment, the TRP may configure a first RS representing the first TRP beam in Carrier 1 based at least in part on a second RS representing the second TRP beam in carrier 2. The first RS is spatially quasi co-located with the second RS. The first TRP beam may be a receive TRP beam or a transmit TRP beam. In one example, the TRP may send the first RS in the first TRP beam of Carrier 1 to the UE, and may configure a receive TRP beam based on the first TRP beam for receiving uplink signals from the UE in Carrier 1. The UE may configure a first UE beam to receive the first RS that is sent in the first TRP beam of Carrier 1. In one example, the UE may configure the first UE beam in Carrier 1 for receiving the first RS based on a second UE beam that has been configured for receiving the second RS sent from the TRP in the second TRP beam of Carrier 2, where the first RS is spatially quasi co-located with the second RS. Information specifying that the first RS is spatially quasi co-located with the second RS may be transmitted to the UE by RRC signaling, a MAC-CE, DCI signaling, or a combination thereof.

In some embodiments, when two HF component carriers (e.g., carrier 1 and carrier 2) are spatially quasi co-located, beam management information in one carrier may be directly used in beam management of the other carrier. For example, when a TRP (or a UE) performs transmissions on a transmit beam in carrier 1 with the UE (or the TRP), the TRP (or UE) may directly use the transmit beam for transmissions with the UE (or the TRP) in carrier 2 without going through procedures of beam sweeping and beam determination. Two spatially quasi co-located HF component carriers maybe referred to as mutually and spatially calibrated when there is a beam mapping between the two HF component carriers in terms of beam direction from a TRP perspective or from a UE perspective. For example, when spatially quasi co-located HF carrier 1 and carrier 2 are mutually and spatially calibrated, there is a beam mapping between a first beam in carrier 1 and a second beam in carrier 2. In this case, the first and the second beams have the same or similar spatial characteristics (e.g., same beam direction, power distribution, etc.), and when the first beam in carrier 1 (or the second beam in carrier 2) is known (e.g., determined or identified), the corresponding mapping beam, i.e., the second beam in carrier 2 (or the first beam in carrier 1) will also be known. In one example, when a TRP or a UE identifies a downlink or uplink beam pair link in carrier 1 with beam management, the TRP and the UE may directly form a downlink or uplink beam pair link in carrier 2. If the two HF component carriers are co-sited but not mutually and spatially calibrated, beam management information in one component carrier may still be helpful for beam management in the other component carrier. For example, when a UE already found a generally best receive beam and transmit beam pair for communications with a TRP over carrier 1, beam management for communications with the TRP over carrier 2 may be done by only performing procedure P-2 in downlink and procedure U-2 in uplink based on the beam pair.

In some embodiments, when a HF component carrier (HF carrier) and a LF component carrier (LF carrier) are spatially quasi co-located, DoA information obtained in the LF carrier with respect to a UE may be used for beam management in the HF carrier for the same UE. For example, when a TRP has obtained downlink DoA information in the LF carrier, downlink beam management of the TRP in the HF carrier may be started with procedure P-3 based on the DoA information, skipping procedures P-1 and P-2. In this case, the TRP determines a downlink beam based on the DoA information and the UE sweeps receive beams to identify the best receive beam with the procedure P-3. The HF carrier and the LF carrier may be referred to as mutually and spatially calibrated when there is a mapping between a beam direction in the HF carrier and a DoA in the LF carrier from a TRP perspective. In this case, a beam in the HF carrier may be determined directly based on the DoA in the LF carrier. In one example, the spatial QCL between a CSI-RS in HF carrier and a beamformed CSI-RS in LF carrier may be established and made known to a UE.

Component carriers that are spatially quasi co-located may be pre-determined or pre-specified, or determined dynamically. Information about the spatially quasi co-located component carriers, or information about whether a component carrier is spatially quasi co-located with another component carrier, may be transmitted to both a transmitter and a receiver in communications, so that both the transmitter and the receiver may make use of the information for beam management. For example, when a TRP or a UE performs beam management for a HF component carrier, e.g., determining a downlink beam or an uplink beam, the TRP or the UE may determine whether the HF component carrier is spatially quasi co-located with one or more other component carriers based on the transmitted information, and then perform beam management using beam management information or other related information of the other spatially quasi co-located component carriers.

In some embodiments, information about spatially quasi co-located component carriers and/or RSs may be transmitted to a UE, e.g., by a TRP, in broadcast signaling, radio resource control signaling, downlink control information signaling, a media access control-control element (MAC-CE) or a combination thereof. In some embodiments, a spatial QCL group may be formed or specified for each set of spatially quasi co-located component carriers. These spatially quasi co-located component carriers may have the same or similar beam profiles. Information about the spatial QCL group may be transmitted to UEs, e.g., using the signaling as described above.

Figure 7:
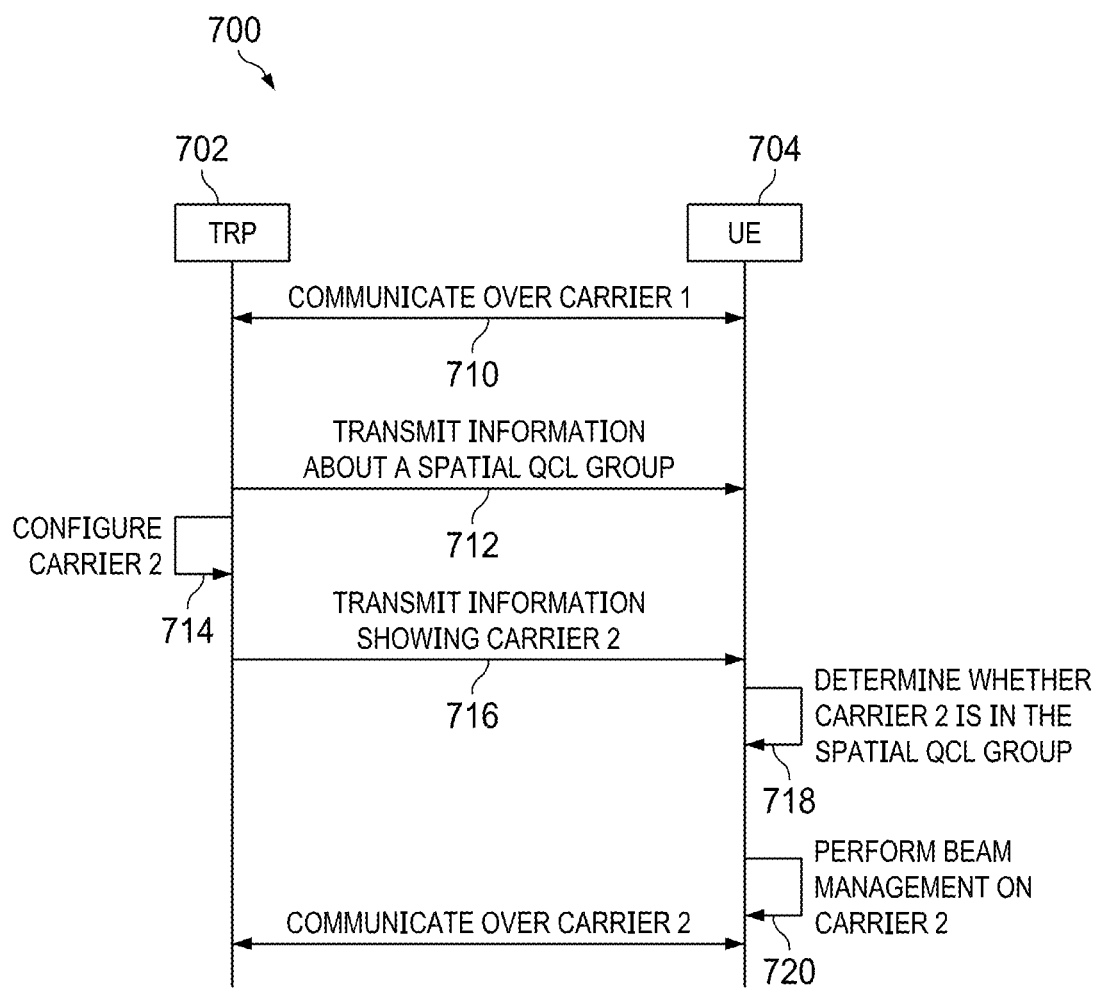
FIG. 7 illustrates a sequence diagram of an embodiment method for wireless communications.

FIG. 7 illustrates a sequence diagram of an embodiment method 700 for wireless communications. In this example, a TRP supports communications with UEs over multiple HF component carriers. As shown, at step 710, a TRP 702 communicates with a UE 704 over a HF component carrier (i.e., carrier 1). In this example, carrier 1 may be understood as a primary carrier. The UE 704 may set up a wireless connection with the TRP 702 over the primary carrier using corresponding beam management procedures as described above. At step 712, the TRP 702 transmits information about a spatial QCL group to the UE 704. The spatial QCL group includes a number of carriers that are spatially quasi co-located. The information about the spatial QCL group may include a group identifier identifying the spatial QCL group. According to the group identifier, the UE 704 may be able to determine the number of carriers in the spatial QCL group. In another example, the information about the spatial QCL group may also include carrier identifiers identifying the number of spatially quasi co-located carriers. The TRP 702 may broadcast the information in a physical broadcast channel, or may be transmitted in RRC, MAC-CE, DCI signaling or a combination thereof. Steps 710 and 712 may not be performed in an order as shown in FIG. 7. For example, step 712 may be performed before step 710. At step 714, the TRP 702 may determine to configure another HF component carrier (i.e., carrier 2) for communication with the UE 704, e.g., based on a service requirement or a transmission requirement. In this example, carrier 2 may be understood as a secondary carrier. The secondary carrier may be configured for uplink or downlink or both uplink and downlink transmissions. At step 716, the TRP 702 may then transmit information to the UE 704, showing that the carrier 2 is configured for communications with the UE 704. The information may be control information. The TRP 702 may transmit the information to the UE 704 over carrier 2, or over carrier 1. At step 718, the UE 704 may determine whether the secondary carrier (i.e., carrier 2) is spatially quasi co-located with the primary carrier (i.e., carrier 1) based on the received spatial QCL group information, e.g., the spatial QCL group identifier. For example, the UE 704 may check whether the primary carrier and the secondary carrier belong to the spatial QCL group. At step 720, the UE 704 performs beam management for communicating with the TRP 702 over the secondary carrier. When determining that the secondary carrier is spatially quasi co-located with the primary carrier, the UE may perform beam management for the secondary carrier based at least in part on beam management information of the primary carrier. At step 722, the UE 704 communicates with the TRP 702 over the secondary carrier.

Figure 8:
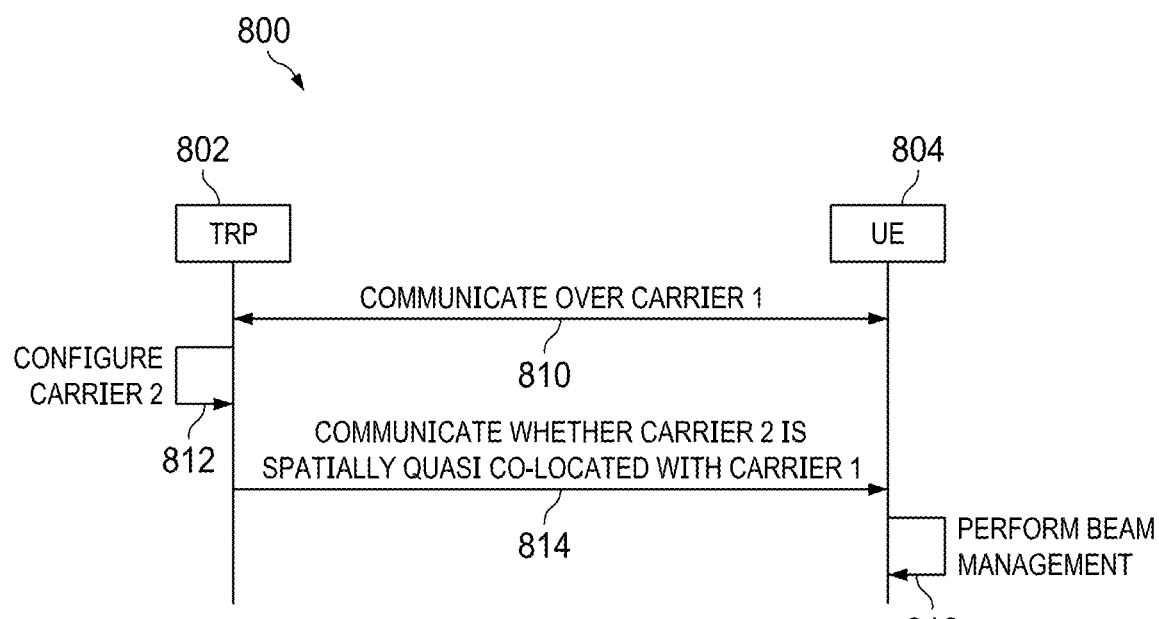
FIG. 8 illustrates another sequence diagram of an embodiment method for wireless communications.

FIG. 8 illustrates a sequence diagram of another embodiment method 800 for wireless communications. Similarly, in this example, a TRP supports communications with UEs over multiple HF component carriers. As shown, at step 810, a TRP 802 communicates with a UE 804 over a HF component carrier (i.e., carrier 1, primary carrier). The UE 804 may set up a wireless connection with the TRP 802 over the primary carrier using corresponding beam management procedures. At step 812, the TRP 802 may determine to configure another HF component carrier (i.e., carrier 2, secondary carrier) for communications with the UE 804, e.g., based on a service requirement or a transmission requirement. The secondary carrier may be configured for uplink or downlink transmissions. At step 814, the TRP 802 may communicate with the UE 804 showing whether carrier 2 is spatially quasi co-located with carrier 1. The TRP 802 may transmit a message to the UE 804. The message may include information or an indication indicating whether the secondary carrier is spatially quasi co-located with the primary carrier. For example, the indication may be a bit value (e.g., a flag bit). A bit value of 1 may be used to indicate that the secondary carrier is spatially quasi co-located with the primary carrier, and a bit value of 0 may be used to indicate that the secondary carrier is not spatially quasi co-located with the primary carrier. The indication may be carried over RRC, MAC-CE or DCI signaling. At step 816, the UE 804 performs beam management for communicating with the TRP 802 over the secondary carrier. When the secondary carrier is spatially quasi co-located with the primary carrier, the UE 804 may perform beam management for the secondary carrier based at least in part on beam management information of the primary carrier.

Figure 9:
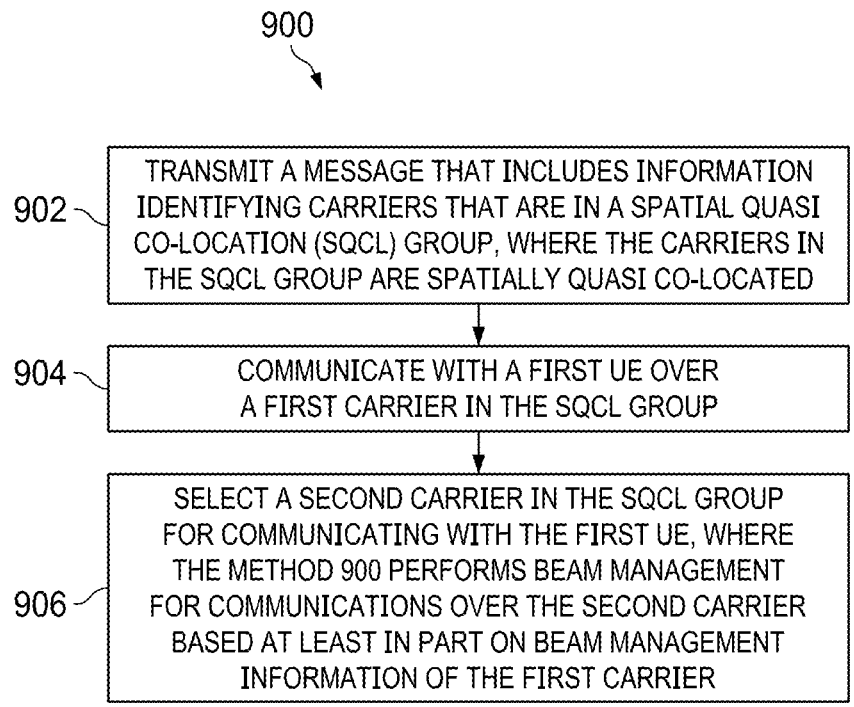
FIG. 9 illustrates a flowchart of an embodiment method for wireless communications.

FIG. 9 illustrates a flowchart of an embodiment 900 for wireless communications. The method may be performed by a TRP that communicates with UEs over multiple component carriers. At step 902, the method 900 transmits a message including information identifying carriers that are in a spatial quasi co-location (SQCL) group, where the carriers in the SQCL group are spatially quasi co-located. At step 904, the method 900 communicates with a first UE over a first carrier in the SQCL group. Step 904 may be performed before or at the same time as step 902. At step 906, the method 900 selects a second carrier in the SQCL group for communicating with the first UE, where the method 900 performs beam management for communications over the second carrier based at least in part on beam management information of the first carrier. The message may be transmitted in a broadcast channel, in radio resource control (RRC) signaling, in a media access control-control element (MAC-CE), in downlink control information (DCI) signaling or in a combination thereof. In one example, the method 900 may configure a first TRP beam for communications between the TRP and the first UE over the second carrier based at least in part on beam management information of the first carrier. The first TRP beam may include a transmit beam of the TRP or a receive beam of the TRP. Configuring a TRP beam may include configuring a RS representing this TRP beam. Spatial QCL may also be established between reference signals in spatially quasi co-located carriers, such as between SS block, between CSI-RSs, between DMRSs, between a SS block and a CSI-RS, between a SS block and a DMRS, and/or between a CSI-RS and a DMRS. In one example, the method 900 may configure a first channel state information reference signal (CSI-RS) in the second carrier based at least in part on a second CSI-RS in the first carrier, and specify, to the UE, that those two CSI-RSs are spatially quasi co-located. In another example, the method 900 may configure a first SS block in the second carrier based at least in part on a second SS block configured in the first carrier, which is spatially quasi co-located with the second carrier. In yet another example, the method 900 may configure an SS block in the second carrier based on at least in part on a CSI-RS in the first carrier, and specify, to the UE, that the SS block is spatially quasi co-located with the CSI-RS. In yet another example, the method 900 may configure a CSI-RS in the second carrier based on at least in part on a SS block in the first carrier, and specify, to the UE, that the CSI-RS is spatially quasi co-located with the SS block. The beam management information of the first carrier in the SQCL group may include a beam power, a beam pattern, a beam pair link (BPL), or a beam gain.

Figure 10:
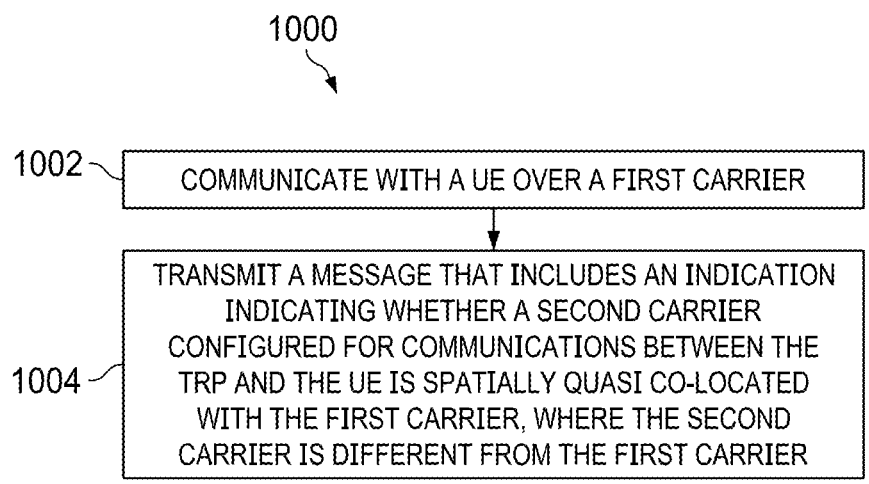
FIG. 10 illustrates a flowchart of another embodiment method for wireless communications.

FIG. 10 illustrates a flowchart of another embodiment 1000 for wireless communications. The method may be performed by a TRP that communicates with UEs over multiple component carriers. At step 1002, the method 1000 communicates with a UE over a first carrier. At step 1004, the method 1000 transmits a message that includes an indication indicating whether a second carrier configured for communications between the TRP and the UE is spatially quasi co-located with the first carrier, where the second carrier is different from the first carrier. The method 1000 may transmit the message in a broadcast channel, in radio resource control signaling, in a media access control-control element or downlink control information signaling. The method 1000 may further communicate with the UE over the second carrier. The second carrier is spatially quasi co-located with the first carrier, and the TRP performs beam management for communications on the second carrier based at least in part on beam management information of the first carrier. In one embodiment, the method 1000 may configure a first TRP beam for communications between the TRP and the UE on the second carrier based at least in part on beam management information of the first carrier, and the first TRP beam includes a transmit beam of the TRP or a receive beam of the TRP. Configuring a TRP beam may include configuring a RS representing this TRP beam. Similarly, as discussed above, spatial QCL may be configured between RSs in spatially quasi co-located carriers, such as between SS blocks, between CSI-RSs, between DMRSs, between a SS block and a CSI-RS, between a SS block and a DMRS, and/or between a CSI-RS and a DMRS. For example, the method 1000 may configure a first CSI-RS (or a first SS block) in the second carrier based at least in part on a second CSI-RS (or a second SS block) in the first carrier. The first CSI-RS or the first SS block is spatially quasi co-located with the second CSI-RS or the second SS block.

Figure 11:
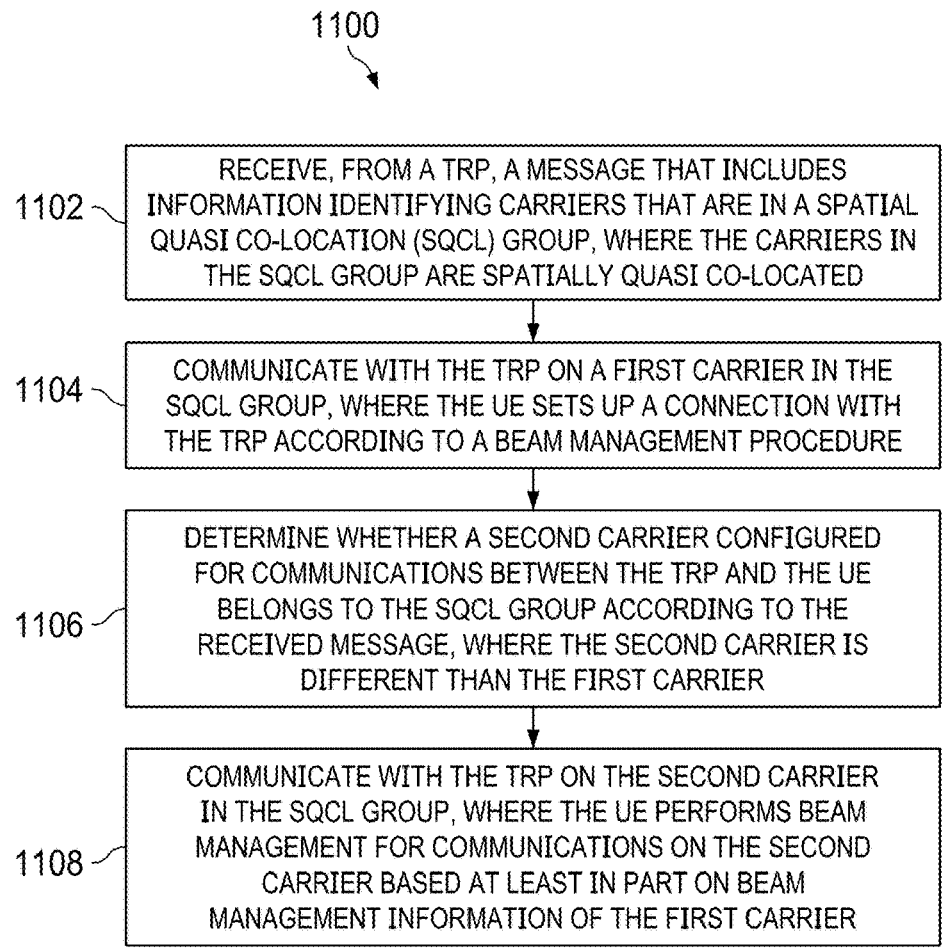
FIG. 11 illustrates a flowchart of yet another embodiment method for wireless communications.

FIG. 11 illustrates a flowchart of yet another embodiment 1100 for wireless communications. The method may be performed by a UE that communicates with a TRP over multiple component carriers. At step 1102, the method 1100 receives, from a TRP, a message that includes information identifying carriers that are in a spatial quasi co-location (SQCL) group, where the carriers in the SQCL group are spatially quasi co-located. At step 1104, the method 1100 communicates with the TRP on a first carrier in the SQCL group, where the UE sets up a connection with the TRP according to a beam management procedure. Step 1104 may be performed before or at the same time as step 1102. At step 1106, the method 1100 determines whether a second carrier configured for communications between the TRP and the UE belongs to the SQCL group according to the received message, where the second carrier is different than the first carrier. At step 1108, the method 1100 communicates with the TRP on the second carrier in the SQCL group, where the UE performs beam management for communications on the second carrier based at least in part on beam management information of the first carrier. The method 1100 may also receive a first RS configuration in the second carrier. The method 1100 may detect the first RS in the second carrier based on the first RS configuration and at least in part on a second RS in the first carrier, where the first RS is spatially quasi co-located with the second RS. Information about the spatial quasi co-location of the first RS and the second RS may be transmitted using RRC signaling, MAC-CE, DCI signaling, or a combination thereof.

Figure 12:
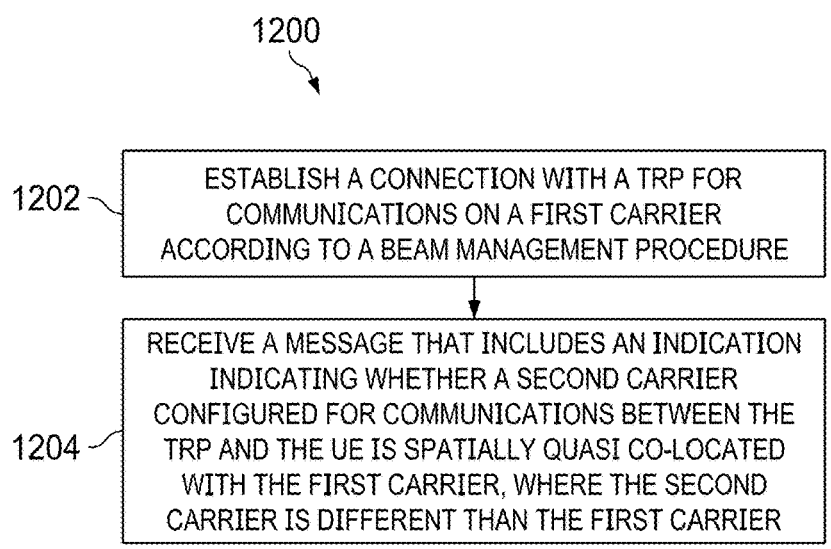
FIG. 12 illustrates a flowchart of yet another embodiment method for wireless communications.

FIG. 12 illustrates a flowchart of yet another embodiment 1200 for wireless communications. The method 1200 may be performed by a UE that communicates with a TRP over multiple component carriers. At step 1202, the method 1200 establishes a connection with a TRP for communications on a first carrier according to a beam management procedure. At step 1204, the method 1200 receives a message that includes an indication indicating whether a second carrier configured for communications between the TRP and the UE is spatially quasi co-located with the first carrier, where the second carrier is different than the first carrier. The method 1200 may communicate with the TRP on the second carrier, where the second carrier is spatially quasi co-located with the first carrier, and the UE performs beam management for communications on the second carrier based at least in part on beam management information of the first carrier. The method 120 may configure a first beam for communications between the UE and the TRP on the second carrier based at least in part on beam management information of the first carrier, where the first beam includes a transmit beam of the UE or a receive beam of the UE. The method 1200 may further receive a first RS configuration in the second carrier, and detect a first RS in the second carrier based on the first RS configuration and based at least in part on a second RS in the first carrier, where the first RS is spatially quasi co-located with the second RS. Information about the spatial quasi co-location between the first RS and the second RS may be transmitted using RRC signaling, MAC-CE, DCI signaling, or a combination thereof.

Figure 13:
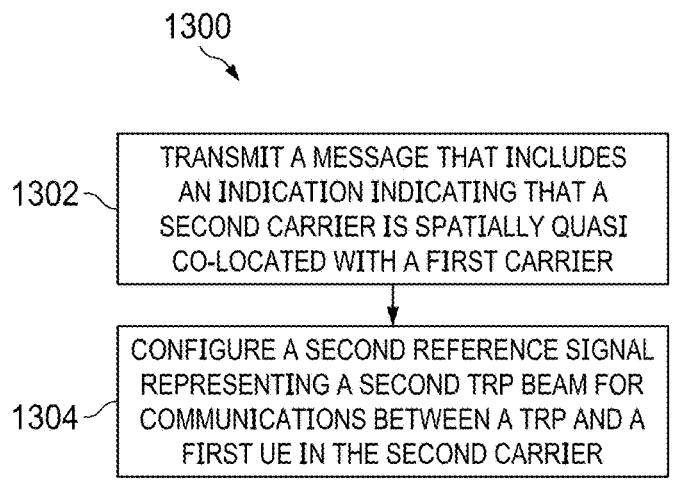
FIG. 13 illustrates a flowchart of yet another embodiment method for wireless communications.

FIG. 13 illustrates a flowchart of yet another embodiment 1300 for wireless communications. The method 1300 may be performed by a TRP that communicates with UEs over multiple component carriers. At step 1302, the method 1300 transmits a message that includes an indication indicating that a second carrier is spatially quasi co-located with a first carrier. At step 1304, the method 1300 may configure a second reference signal representing a second TRP beam for communications between the TRP and a first UE in the second carrier. The method 1300 may configured the second reference signal based at least in part on a first reference signal representing a first TRP beam for communications between the TRP and the first UE in the first carrier. The second reference signal is spatially quasi co-located with the first reference signal.

Figure 14:
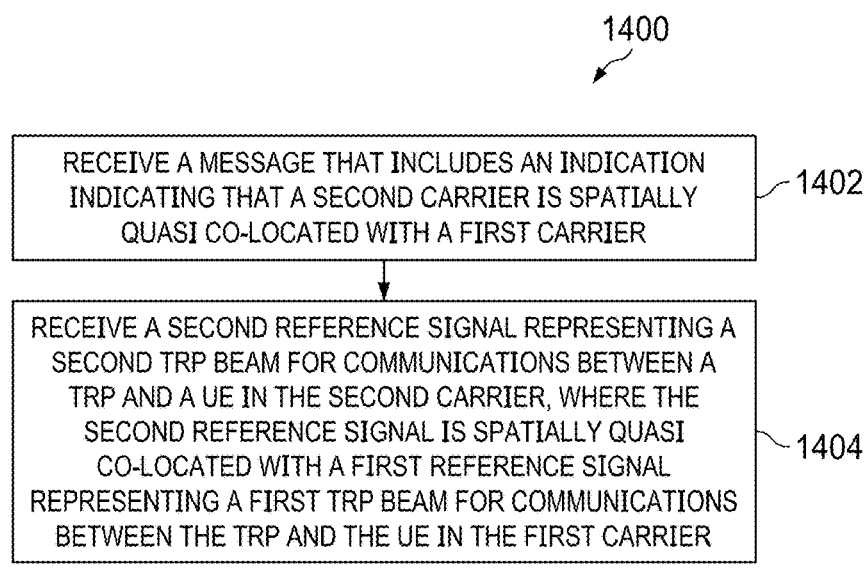
FIG. 14 illustrates a flowchart of yet another embodiment method for wireless communications.

FIG. 14 illustrates a flowchart of yet another embodiment 1400 for wireless communications. The method 1400 may be performed by a UE that communicates with a TRP over multiple component carriers. At step 1402, the method 1400 receives a message that includes an indication indicating that a second carrier is spatially quasi co-located with a first carrier. The indication may indicate a spatial quasi co-location (SQCL) carrier group, where the SQCL carrier group includes the first carrier and the second carrier. At step 1402, the method 1400 may receive a second reference signal representing a second TRP beam for communications between the TRP and the UE in the second carrier. The second reference signal is spatially quasi co-located with a first reference signal representing a first TRP beam for communications between the TRP and the UE in the first carrier.

Figure 15:
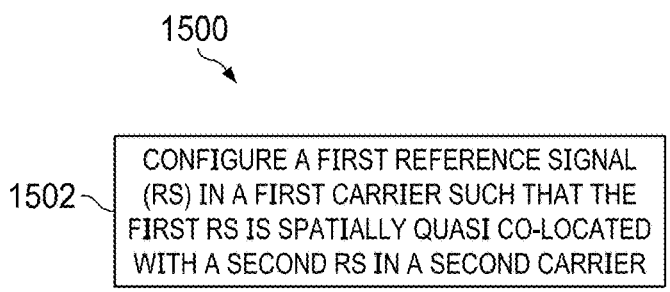
FIG. 15 illustrates a flowchart of yet another embodiment method for wireless communications.

FIG. 15 illustrates a flowchart of yet another embodiment 1500 for wireless communications. The method 1500 may be performed by a TRP that communicates with UEs over multiple component carriers. At step 1502, the method 1500 configures a first reference signal (RS) in a first carrier such that the first RS is spatially quasi co-located with a second RS in a second carrier.

Figure 16:
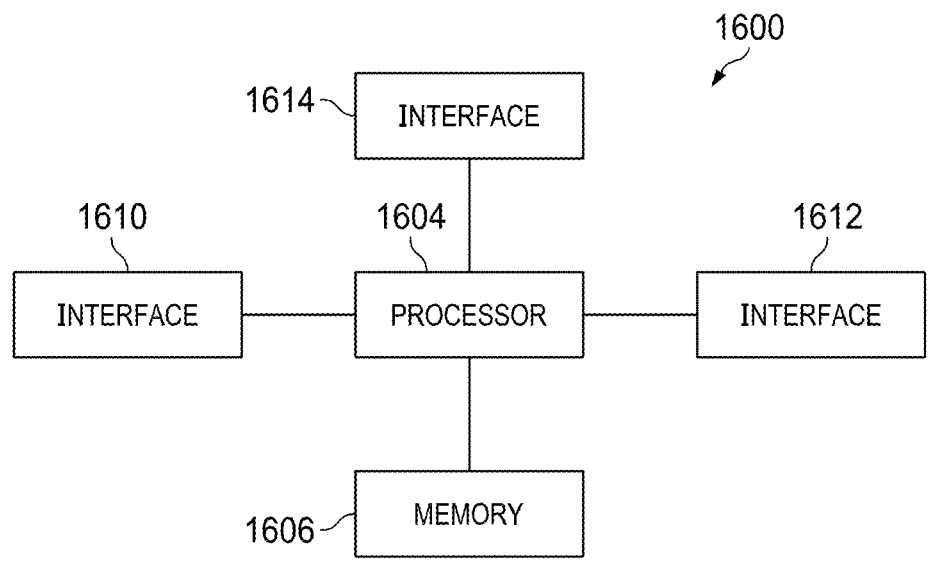
FIG. 16 illustrates a diagram of an embodiment processing system.

FIG. 16 illustrates a block diagram of an embodiment processing system 1600 for performing methods described herein, which may be installed in a host device. As shown, the processing system 1600 includes a processor 1604, a memory 1606, and interfaces 1610-1614, which may (or may not) be arranged as shown in FIG. 16. The processor 1604 may be any component or collection of components adapted to perform computations and/or other processing related tasks, and the memory 1606 may be any component or collection of components adapted to store programming and/or instructions for execution by the processor 1604. In an embodiment, the memory 1606 includes a non-transitory computer readable medium. The interfaces 1600, 1612, 1614 may be any component or collection of components that allow the processing system 1600 to communicate with other devices/components and/or a user. For example, one or more of the interfaces 1610, 1612, 1614 may be adapted to communicate data, control, or management messages from the processor 1604 to applications installed on the host device and/or a remote device. As another example, one or more of the interfaces 1610, 1612, 1614 may be adapted to allow a user or user device (e.g., personal computer (PC), etc.) to interact/communicate with the processing system 1600. The processing system 1600 may include additional components not depicted in FIG. 16, such as long term storage (e.g., non-volatile memory, etc.).

In some embodiments, the processing system 1600 is included in a network device that is accessing, or part otherwise of, a telecommunications network. In one example, the processing system 1600 is in a network-side device in a wireless or wireline telecommunications network, such as a base station, a relay station, a scheduler, a controller, a gateway, a router, an applications server, or any other device in the telecommunications network. In other embodiments, the processing system 1600 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 17:
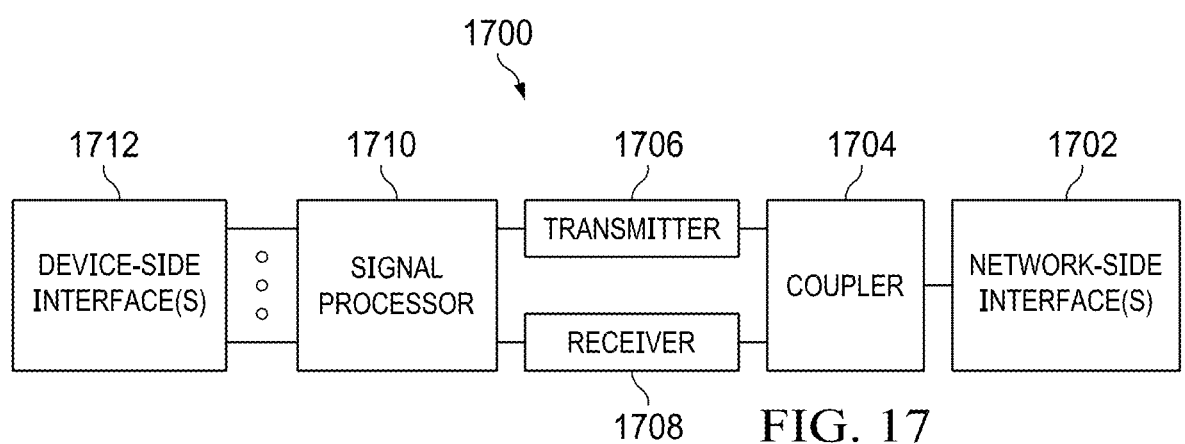
FIG. 17 illustrates a diagram of an embodiment transceiver.

In some embodiments, one or more of the interfaces 1610, 1612, 1614 connects the processing system 1600 to a transceiver adapted to transmit and receive signaling over the telecommunications network. FIG. 17 illustrates a block diagram of a transceiver 1700 adapted to transmit and receive signaling over a telecommunications network. The transceiver 1700 may be installed in a host device. As shown, the transceiver 1700 comprises a network-side interface 1702, a coupler 1704, a transmitter 1706, a receiver 1708, a signal processor 1710, and a device-side interface 1712. The network-side interface 1702 may include any component or collection of components adapted to transmit or receive signaling over a wireless or wireline telecommunications network. The coupler 1704 may include any component or collection of components adapted to facilitate bi-directional communication over the network-side interface 1702. The transmitter 1706 may include any component or collection of components (e.g., up-converter, power amplifier, etc.) adapted to convert a baseband signal into a modulated carrier signal suitable for transmission over the network-side interface 1702. The receiver 1708 may include any component or collection of components (e.g., down-converter, low noise amplifier, etc.) adapted to convert a carrier signal received over the network-side interface 1702 into a baseband signal. The signal processor 1710 may include any component or collection of components adapted to convert a baseband signal into a data signal suitable for communication over the device-side interface(s) 1712, or vice-versa. The device-side interface(s) 1712 may include any component or collection of components adapted to communicate data-signals between the signal processor 1710 and components within the host device (e.g., the processing system 1600, local area network (LAN) ports, etc.).

The transceiver 1700 may transmit and receive signaling over any type of communications medium. In some embodiments, the transceiver 1700 transmits and receives signaling over a wireless medium. For example, the transceiver 1700 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 1702 comprises one or more antenna/radiating elements. For example, the network-side interface 1702 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 1700 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. Other steps may be performed by a selecting unit/module, a configuring unit/module, a communicating unit/module, a determining unit/module, a broadcasting unit/module, an establishing unit/module, a specifying unit/module, and/or a detecting unit/module. The respective units/modules may be hardware, software, or a combination thereof. For instance, one or more of the units/modules may be an integrated circuit, such as field programmable gate arrays (FPGAs) or application-specific integrated circuits (ASICs).

Although the description has been described in detail, it should be understood that various changes, substitutions and alterations can be made without departing from the spirit and scope of this disclosure as defined by the appended claims. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

What is claimed:

1. A method comprising:
transmitting, by a transmit receive point (TRP), a first signal over a first carrier and a second signal over a second carrier, the first carrier and the second carrier being spatially quasi co-located such that transmit beam(s) for transmitting from the TRP to a user equipment (UE) over the second carrier are configurable based on transmit beam management information of the first carrier; and
transmitting, by the TRP, a message indicating that the second signal is spatially quasi co-located with the first signal.

2. The method of claim 1, wherein the message is transmitted via a broadcast channel.

3. The method of claim 1, wherein the message is transmitted via radio resource control (RRC) signaling.

4. The method of claim 1, wherein the message includes a bit value indicating that the second signal is spatially quasi co-located with the first signal.

5. The method of claim 1, wherein the transmit beam(s) comprise the transmit beam of the TRP.

6. The method of claim 1, wherein configuring the transmit beam(s) of the second carrier comprises configuring a channel state information reference signal (CSI-RS), a synchronization signal block (SSB), a demodulation reference signal (DMRS), a phase tracking reference signal (PTRS), a tracking reference signal (TRS), a sounding reference signal (SRS), or a combination thereof.

7. The method of claim 1, wherein the transmit beam management information of the first carrier comprises a beam power, a beam pattern, a beam pair link (BPL), a beam gain, an uplink beam angle, a downlink beam angle, a downlink and uplink beam group, or a combination thereof.

8. The method of claim 1, wherein the first carrier is a high frequency carrier and the second carrier is a low frequency carrier.

9. The method of claim 1, wherein one of the second carrier is a high frequency carrier and the first carrier is a low frequency carrier.

10. The method of claim 1, wherein a first frequency of the first carrier is located in a first band, and wherein a second frequency of the second carrier is located in a second band.

11. The method of claim 1, wherein the transmit beam(s) in the second carrier are configurable via a CSI-RS associated with the second carrier based on a first RS associated with the transmit beam management information of the first carrier.

12. A transmit receive point (TRP) comprising:
at least one processor; and
a non-transitory computer readable storage medium storing programming for execution by the at least one processor, the programming including instructions to cause the TRP to:
transmit a first signal over a first carrier and a second signal over a second carrier, the first carrier and the second carrier being spatially quasi co-located such that transmit beam(s) for transmitting from the TRP to a user equipment (UE) over the second carrier are configurable based on transmit beam management information of the first carrier; and
transmit a message indicating that the second signal is spatially quasi co-located with the first signal.

13. The TRP of claim 12, wherein the message is transmitted via a broadcast channel.

14. The TRP of claim 12, wherein the message is transmitted via radio resource control (RRC) signaling.

15. The TRP of claim 12, wherein the message includes a bit value indicating that the second signal is spatially quasi co-located with the first signal.

16. The TRP of claim 12, wherein the transmit beam(s) comprise the transmit beam of the TRP.

17. The TRP of claim 12, wherein configuring the transmit beam(s) of the second carrier comprise configuring a channel state information reference signal (CSI-RS), a synchronization signal block (SSB), a demodulation reference signal (DMRS), a phase tracking reference signal (PTRS), a tracking reference signal (TRS), a sounding reference signal (SRS), or a combination thereof.

18. The TRP of claim 12, wherein the transmit beam management information of the first carrier comprises a beam power, a beam pattern, a beam pair link (BPL), a beam gain, an uplink beam angle, a downlink beam angle, a downlink and uplink beam group, or a combination thereof.

19. The TRP of claim 12, wherein the first carrier is a high frequency carrier and the second carrier is a low frequency carrier.

20. The TRP of claim 12, wherein one of the second carrier is a high frequency carrier and the first carrier is a low frequency carrier.

21. A method comprising:
receiving, by a user equipment (UE), a message from a transmit receive point (TRP) indicating that a second carrier is spatially quasi co-located with a first carrier such that transmit beam(s) for transmitting from the TRP to the UE over the second carrier are configurable based on transmit beam management information of the first carrier for communications between the TRP and the UE over the first carrier; and
receiving, by the UE, the transmit beam management information of the first carrier, a transmit beam of the second carrier from the TRP over the second carrier being configured in accordance with the transmit beam management information of the first carrier.

22. The method of claim 21, wherein the message is transmitted via a broadcast channel.

23. The method of claim 21, wherein the message is transmitted via radio resource control (RRC) signaling.

24. The method of claim 21, wherein the message includes a bit value indicating that a second signal over the second carrier is spatially quasi co-located with a first signal over the first carrier.

25. The method of claim 21, wherein the transmit beam(s) comprise the transmit beam of the TRP.

26. The method of claim 21, wherein configuring the transmit beam(s) of the second carrier comprises configuring a channel state information reference signal (CSI-RS), a synchronization signal block (SSB), a demodulation reference signal (DMRS), a phase tracking reference signal (PTRS), a tracking reference signal (TRS), a sounding reference signal (SRS), or a combination thereof.

27. The method of claim 21, wherein the transmit beam management information of the first carrier comprises a beam power, a beam pattern, a beam pair link (BPL), a beam gain, an uplink beam angle, a downlink beam angle, a downlink and uplink beam group, or a combination thereof.

28. The method of claim 21, wherein the first carrier is a high frequency carrier and the second carrier is a low frequency carrier.

29. The method of claim 21, wherein one of the second carrier is a high frequency carrier and the first carrier is a low frequency carrier.

30. A user equipment (UE) comprising:
at least one processor; and
a non-transitory computer readable storage medium storing programming for execution by the at least one processor, the programming including instructions to cause the UE to:
receive a message from a transmit receive point (TRP) indicating that a second carrier is spatially quasi co-located with a first carrier such that transmit beam(s) for transmitting from the TRP to the UE over the second carrier are configurable based on transmit beam management information of the first carrier for communications between the TRP and the UE over the first carrier; and
receive the transmit beam management information of the first carrier, a transmit beam of the second carrier from the TRP over the second carrier being configured in accordance with the transmit beam management information of the first carrier.

31. The UE of claim 30, wherein the message is transmitted via a broadcast channel.

32. The UE of claim 28, wherein the message is transmitted via radio resource control (RRC) signaling.

33. The UE of claim 30, wherein the message includes a bit value indicating that a second signal over the second carrier is spatially quasi co-located with a first signal over the first carrier.

34. The UE of claim 30, wherein the transmit beam(s) comprise the transmit beam of the TRP.

35. The UE of claim 30, wherein configuring the transmit beam(s) of the second carrier comprises configuring a channel state information reference signal (CSI-RS), a synchronization signal block (SSB), a demodulation reference signal (DMRS), a phase tracking reference signal (PTRS), a tracking reference signal (TRS), a sounding reference signal (SRS), or a combination thereof.

36. The UE of claim 30, wherein the transmit beam management information of the first carrier comprises a beam power, a beam pattern, a beam pair link (BPL), a beam gain, an uplink beam angle, a downlink beam angle, a downlink and uplink beam group, or a combination thereof.

37. The UE of claim 30, wherein the first carrier is a high frequency carrier and the second carrier is a low frequency carrier.

38. The UE of claim 30, wherein one of the second carrier is a high frequency carrier and the first carrier is a low frequency carrier.

* * * * *